United States Patent [19]
Wakita et al.

[11] 3,842,240
[45] Oct. 15, 1974

[54] SOLDER REMOVING APPARATUS

[75] Inventors: Katumasa Wakita, Yokohama; Issei Yunoki; Mitunari Yoshida, both of Tokyo, all of Japan

[73] Assignee: Stanley Electric Co., Ltd., Tokyo, Japan

[22] Filed: Sept. 15, 1972

[21] Appl. No.: 289,562

[30] Foreign Application Priority Data
Sept. 17, 1971 Japan............................. 46-84514
Oct. 4, 1971 Japan............................. 46-91013
Jan. 13, 1972 Japan............................. 47-6428
Sept. 27, 1971 Japan............................. 46-75310

[52] U.S. Cl................... 219/230, 15/375, 219/236, 219/238, 228/20, 228/53
[51] Int. Cl.......................... H05b 1/00, B23k 3/04
[58] Field of Search.... 219/229, 230, 231, 236–239; 15/421, 375, 319; 228/19–21, 52, 53; 32/33, 70

[56] References Cited
UNITED STATES PATENTS
| | | | |
|---|---|---|---|
| 953,825 | 4/1910 | Gekeler | 15/421 |
| 2,826,667 | 3/1958 | Brillinger | 228/20 |
| 2,885,782 | 5/1959 | Groves | 32/33 |
| 2,955,187 | 10/1960 | Campo | 228/20 |
| 2,955,188 | 10/1960 | Campo | 228/20 |
| 3,163,145 | 12/1964 | Duhaime et al. | 228/20 |
| 3,211,354 | 10/1965 | Dugard et al. | 228/20 |
| 3,245,598 | 4/1966 | Kopernak | 228/20 |
| 3,392,897 | 7/1968 | Siegel | 228/20 |
| 3,690,539 | 9/1972 | Geiger | 228/20 |
| 3,702,917 | 11/1972 | Christensen | 219/230 |

FOREIGN PATENTS OR APPLICATIONS
394,252   6/1933   Great Britain............................ 32/33

Primary Examiner—A. Bartis
Attorney, Agent, or Firm—Ostrolenk, Faber, Gerb & Soffen

[57] ABSTRACT

Solder removing apparatus used for detaching soldered parts by melting and sucking the solder comprises a hollow tube connected to a hollow bit at one end and to a solder receiving chamber at its other end. An electric heating coil enclosed in a hollow housing surrounds the tube for heating the tube and bit above solder melting temperature. The solder receiving chamber is a separate removable glass element provided within a hollow support tube attached to a hand grip. An air passage extending through the hand grip is connected at one end to the solder receiving chamber and at its other end to a vacuum pump. A trigger operated valve is provided in the air passage. A vacuum charge tank is provided in the hand grip and is located in the air passage between the valve and the pump. The air passage includes an adjustable suction regulating ball valve which opens at a predetermined suction pressure in the air passage.

4 Claims, 10 Drawing Figures

PATENTED OCT 15 1974

SOLDER REMOVING APPARATUS

This invention relates to a solder removing apparatus. More particularly, the invention relates to an improved solder removing apparatus used for detaching the electric components or lead wires which are soldered to the circuit board of electric or electronic machines such as electronic computers. Still more particularly, the invention relates to a solder removing apparatus for heating and melting the solder and for sucking and removing the molten solder.

Often soldered parts or wires are removed in case of, for example, repairs of electric machines or mis-wiring in the production of such machines. In order to remove the solder, the melt-suction type solder removing apparatus in which a hollow soldering iron is provided with a suction device is used, and when the solder is made molten by the heat of iron, the molten solder is sucked through the hollow portion. The solder removing apparatus of this type is well known and disclosed, for example, in U.S. Pat. No. 3,392,897. That is, the apparatus communicates with a bit, and includes a heat insulating member to prevent the heat transfer, a hand grip fixed to a heater through said insulating member and which grip serves as the operating member, and said hand grip communicates with said hollow portions of the bit and the heater, and the apparatus is provided with a solder receiver which is connected to a vacuum pump through a pipe. By switching on the heater and the vacuum pump, the bit of the apparatus is heated by the heater, the solder is melted by the heated bit, the molten solder is sucked from the bit through the hollow of the heater to the solder receiver, and the solder by which the electric parts are attached to a circuit board is removed. However, this ordinary apparatus has several defects.

In the first place, with the insulating material between the heater and the hand grip, the rise in temperature of the hand grip by direct heat transfer is not large. However, when heating and suction are continued for a long time, the hand grip is heated considerably by the hot air, and eventually the work cannot be continued on account of such heat. Therefore, continuous use of the apparatus cannot be expected in practice.

Secondly, on some occasions, the solder removing work must be carried out at a distance from the vacuum pump, and the vacuum connecting pipe fitted to the removing apparatus must be long enough. It takes a relatively long time to generate the suction at the bit after the switch of the vacuum pump is turned on.

Thirdly, in order to operate the vacuum pump only during the suction stage, if the switch for the motor of the vacuum pump is provided separately from the heater switch, a vacuum pump provided having a motor with good starting characteristic is necessary. In addition, the separate switch is inconvenient for operation and causes some misoperations.

Further, the ordinary bit of the solder removing apparatus is made of copper. An alloy of copper and of the tin of the solder is formed which damages of the tip of the bit. Also copper is a good conductor, so that a short circuit or other troubles are liable to happen in the hot line work. In addition, when the bit is heated, its mechanical strength is decreased, and further heat loss is caused in the heat transfer to the bit. Accordingly, effective heating of the bit cannot be carried out, and work on large articles cannot be carried out conveniently.

Still further, the bits of these apparatus are made of round bars. Thus, if a large number of parts are soldered on a relatively narrow terminal plate, it is difficult to melt only one of the soldered connections because said round bar is liable to contact other adjacent parts. Therefore, other solder connections besides the desired one are melted and separate other lead wires or char the vinyl coatings of the other wires. For this reason, it is known to taper off the top of said bit. However, a thin bit is easily bent by heating and it is not sufficient in its heat capacity, so that effective work to remove the solder cannot be expected.

Furthermore, the ordinary solder removing apparatus is provided with a solder stopper. However, as a filter is not provided, fine particles of the solder are introduced into the rear portion of the, which clogs the pipe or vacuum pump. Additionally, the suction pipe and the take out pipe are positioned on the same axis. Therefore the sucked solder is apt to concentrate in the take out pipe and accumulate on the front face of the solder stopper, so that the suction of the take out pipe is reduced. And even though a wide solder receiving pipe is used, if the front face of the solder stopper is clogged, the suction capacity is much reduced. Accordingly, said pipe must be changed leaving relatively large free space. Therefore the workability is decreased.

The object of the present invention is to overcome such shortcomings.

A further object of the invention is to provide a novel solder removing apparatus in which the air flow to the vacuum pump can be stopped and is cushioned by a vacuum charge tank.

A further object of the invention is to provide a solder removing apparatus which removes the solder instantaneously with a predetermined level of suction.

A further object of the present invention is to provide a solder removing apparatus in which the solder sucked into the solder receiving section is not introduced to the vacuum pump.

A further object of the present invention is to provide a solder removing apparatus in which the air flow for removing the molten solder can be regulated easily by a regulating valve fitted in the hand grip.

A further object of the present invention is to provide a solder removing apparatus which is provided with a rotatable and removable bit, a heater and a support tube.

A further object of the present invention is to provide a novel bit used for said solder removing apparatus, which bit is large in its heat transfer capacity and with which solder removal can be facilitated.

A further object of the present invention is to provide a bit for the solder removing apparatus, which bit is covered with insulating material on its top portion.

A further object of the present invention is to provide a solder receiver for the solder removing apparatus where the capacity of said receiver is improved.

Pursuant to the above objects, in the solder removing apparatus of the present invention, the air stop valve is operated by a trigger and is provided between the solder receiving section and the vacuum pump, a vacuum charge tank is provided between said air stop valve and the vacuum pump adjacent to said stop valve, said solder receiving section is made detachable, a filter is provided detachably in the rear portion of the solder stopper, an air flow regulating valve is provided in the air passage of the hand grip, said air passage is connected to the vacuum pump through a pipe and a joint, and said joint is provided with a suction regulating device to prevent excessive vacuum.

The bit of the solder removing apparatus of the invention has a connecting portion to be fixed to a suction pipe and a solder suction hole within the bit itself, and is characterized in that the free end portion of the bit is formed flat, the top portion of the bit is provided with an inclined surface, and on the top portion on said inclined surface the opening into said suction hole is formed by a notch, thereby the molten solder is sucked effectively. Furthermore the extended portion of the suction pipe is engaged with said bit, and a heater is provided around said extended portion. Still further, the top portion of said bit may be coated with insulating material to prevent any short circuit during the work and the corrosion by alloy formation.

The solder receiving section used for the solder removing apparatus of the present invention is closed by a sealing member at one end. The other end of the section is closed with another sealing member which is inserted with a suction pipe. The side wall of the section is attached to a take out pipe by using another sealing member. The take out pipe communicates with the vacuum pump. The length of the portion of said take out pipe which is inserted into said section can be regulated.

These and other objects and features of the invention will become more apparent by referring to the following detailed description presented solely for purpose of illustration and to the accompanying drawings in which.

Figure 1:
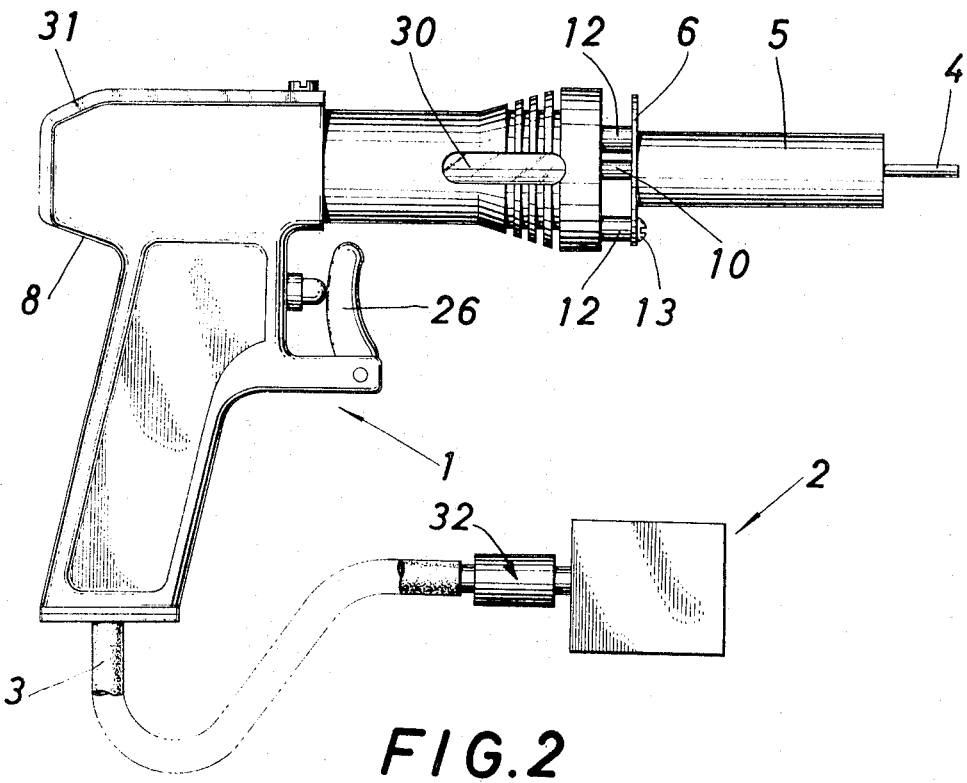
FIG. 1 is a side view of one embodiment of the solder removing apparatus of the present invention.
Figure 2:
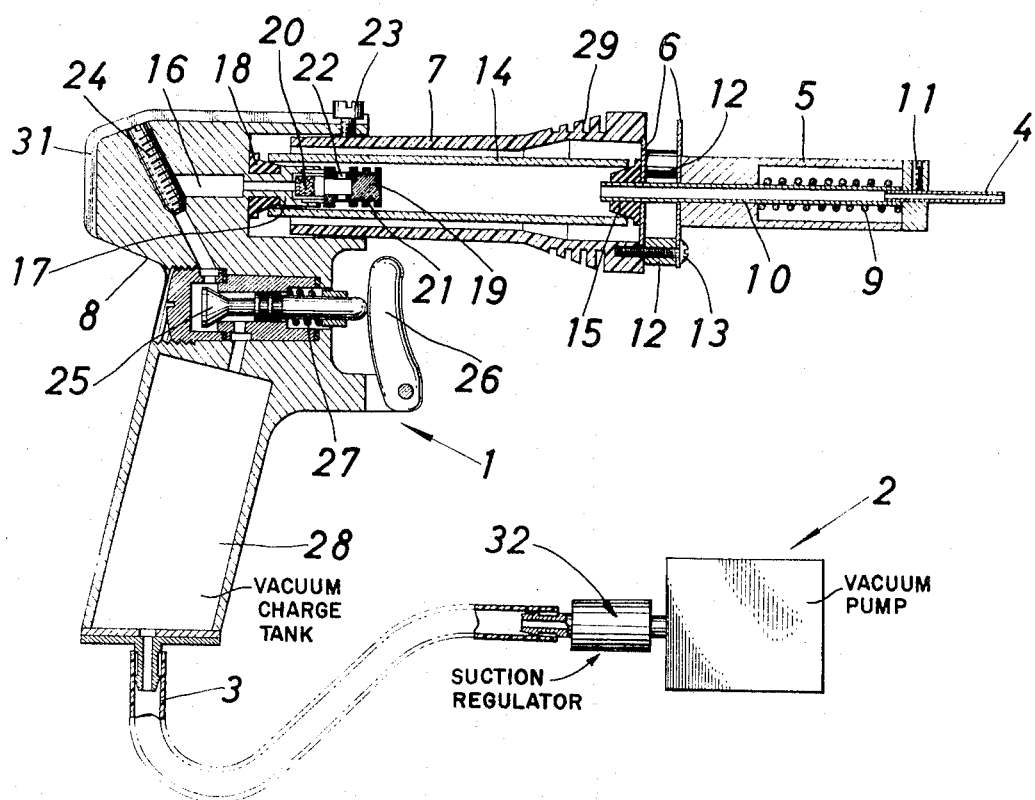
FIG. 2 is a vertical sectional view of the embodiment as shown in FIG. 1.
Figure 3:
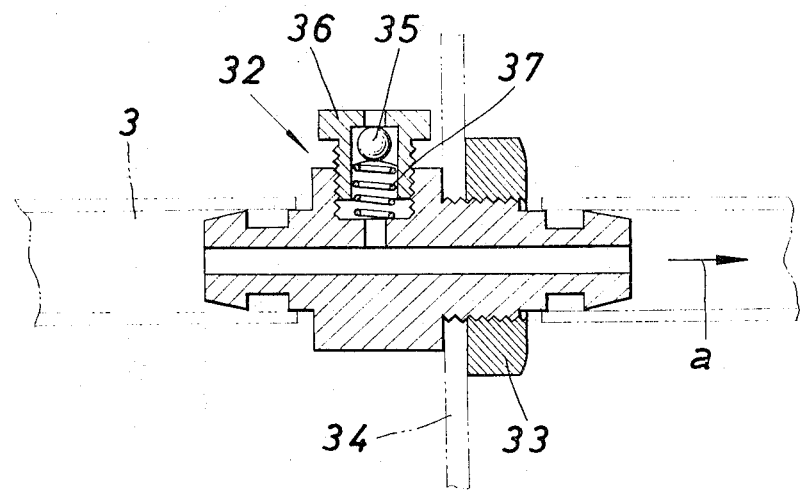
FIG. 3 is a vertical sectional view of the joint provided between the vacuum pipe and the vacuum pump of said embodiment.

Now, referring to FIGS. 1 to 3, the melt-suction type solder removing apparatus of the invention comprises a solder removing device 1 for melting and sucking solder, a vacuum pump 2 for sucking and removing the molten solder, and a vacuum pipe 3 connecting the above-mentioned solder removing device 1 and the vacuum pump 2.

In the solder removing device 1, a hollow bit 4 is detachably provided with a heater 5 which is secured to a supporting tube 7 by way of a heat insulating member 6. Said supporting tube 7 is detachably fixed to a hand grip 8. Said bit 4 comprises a hollow cylinder, one end of which is attached to a hollow pipe 10 in the heater 5 and is fixed to the heater 5 by a set screw 11. A heating coil 9 is provided around said hollow pipe 10. Said heater 5 is attached by screws 13 to said hollow tube 7 which is made of synthetic resin. The heat insulating member 6 and a plurality of tubular washers 12 are interposed between the heater 5 and the support tube 7 in order to prevent heat transfer to the tube 7. The rear end of said hollow pipe 10 is inserted into the support tube 7. A glass pipe 14 is positioned within said support tube 7 for receiving the molten solder. One end of said glass pipe 14 is provided with a connecting member 15 which is made of heat resisting rubber such as silicone rubber and is attached to the peripheral portion of the rear end of said pipe 10, whereby airtightness between the pipe 10 and the glass pipe 14 can be obtained. The other end of said glass pipe 14 is connected with the hand grip 8 by a connecting member 18 which is integrally formed on the projection 17 of the hand grip 8. The glass pipe 14 communicates with the air passage 16 with airtightness.

A filter 20 is inserted into the hollow portion of said projection 17. A solder stopper 19 is attached to the open end portion of the projection 17. Stopper 19 is provided with radiation fins 21 on its peripheral surface and with an air aperture 22 to communicate with said air passage 16. The rear end of said support tube 7 is inserted into the hand grip 8 and detachably secured thereto by a set screw 23.

In order to regulate the air flow through the air passage 16, the hand grip is provided with a regulating valve 24 and a stop valve 25. The stem of the stop valve 25 can be slid by means of a trigger 26 to open and close the valve. The stop valve 25 is generally closed by a coil spring 27. Before the air stop valve 25 in the hand grip 8, a vacuum charge tank 28 is provided in order to improve and stabilize the suction during the operation. Tank 28 communicates with vacuum pump 2 through the pipe 3. The support tube 7 is provided with radiation fins 29 at the front end thereof so as to remove the heat from the heater 5 and a sight hole 30 to observe the connecting portion of the pipe 10. Further, hand grip 8 is provided with radiation fins 31 in order to remove the heat of the hot air during the suction.

A preferable example of the joint 32 to connect the pipe 3 and the vacuum pump 2 is shown in FIG. 3, in which the arrow *a* indicates the direction of the air flow during the suction. This joint 32 is fixed to the wall portion 34 of the casing containing the vacuum pump 2 by a set screw 33. A ball valve 35 is attached to said joint 32 by a suction regulating member 36 and a coil spring 37 in order to form a branch line to prevent excessive vacuum. Both of the suction regulating member 36 and the coil spring 37 interact with each other to determine the air pressure of the starting of the suction control. At the same time, the air pressure in the vacuum charge tank 28 and the load for the vacuum pump 2 can be regulated.

Figure 4:
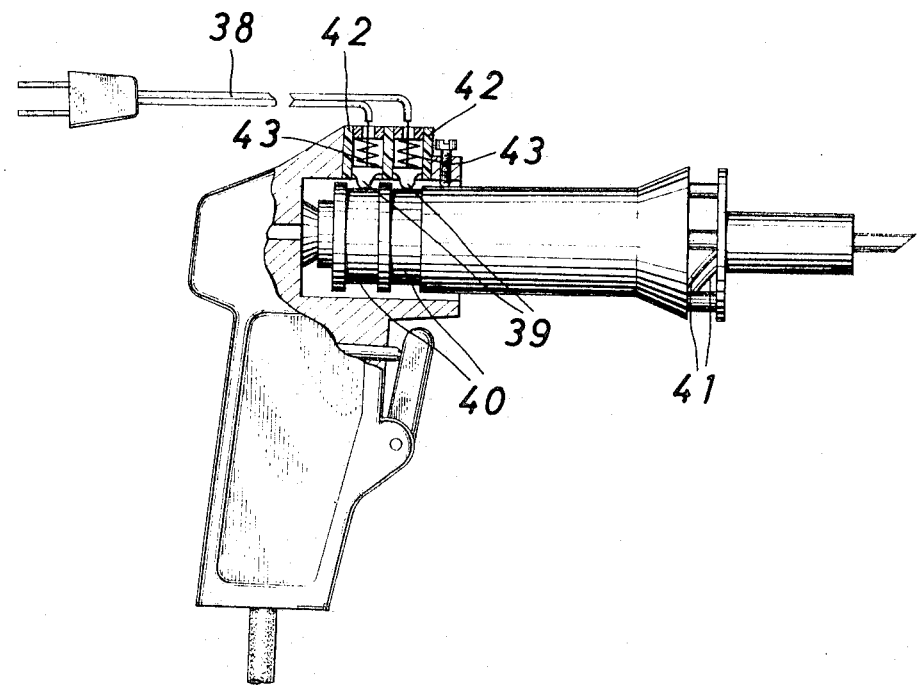
FIG. 4 is a partial sectional view of the embodiment showing the mechanism of the electric power supply.

The supply of the electric power for the heater 5 can be carried out by the embodiment as shown in FIG. 4. The device for the electric supply consists of a flexible cord 38 with a plug, electro-conductive contacts 39 and electroconductive rings which are secured to the periphery of the rear end of said support tube 7. Said rings are electrically connected with the heating coil 9 in the heater 5 through the heater cords 41. Cords 38 are connected to the contacts 39. Said contacts 39 are covered within an insulation cover 42 and are pushed to said rings 40 by coil springs 43. The heater 5 is supplied with the electric power through the contacts 39 and the rings 40.

In the operation of the solder melt-suction type apparatus of the present invention having the above-mentioned structure, the vacuum pump 2 is driven and the coil 9 of the heater 5 is supplied with electric power in the first place. Thus the pressure in the vacuum charge tank 28 is reduced. When the vacuum level in said tank 28 become a certain value, the suction regulating member 36 of the joint 32 will come into action, whereby vacuum level in said vacuum charge tank 28 and the suction force can be controlled. In such condition, the heater 5, the pipe 10 and the hollow bit 4 are already heated. The operator holds the soldering device 1 in one hand and applies the bit 4 to the solder (not shown) to melt and remove it. Simultaneously with the melting of solder, the trigger 26 is pulled by a finger to open the air stop valve 25. Suction at the bit 4 is produced through the air passage 16, the filter 20, the solder stopper 19, the glass pipe 14 and the pipe 10. In this manner, the molten solder is sucked by the device 1. This sucked solder is stored in said glass pipe 14. Even the very fine particles of solder are not sucked into the air passage 16 because of said solder stopper 19 and the filter 20.

The above-mentioned control of the suction force can be carried out by the suction regulating member 36 of the joint 32 and also by the regulating valve 24 for the air flow. As the above support tube 7 and the glass pipe 14 are separable, the solder sucked into the glass pipe 14 in the device can be taken out with ease. Further, the vacuum in the charge tank 28 of the hand grip 8 is kept at a certain level so that just upon the opening of the stop valve 25, the molten solder can be sucked from the hollow bit 4.

Figure 5:
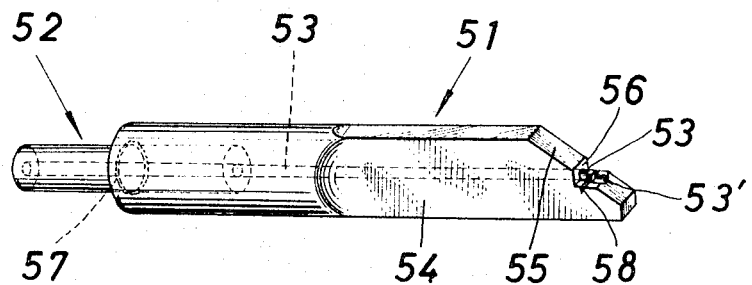
FIG. 5 is a perspective view of the bit used for the solder removing apparatus of the invention.
Figure 6:
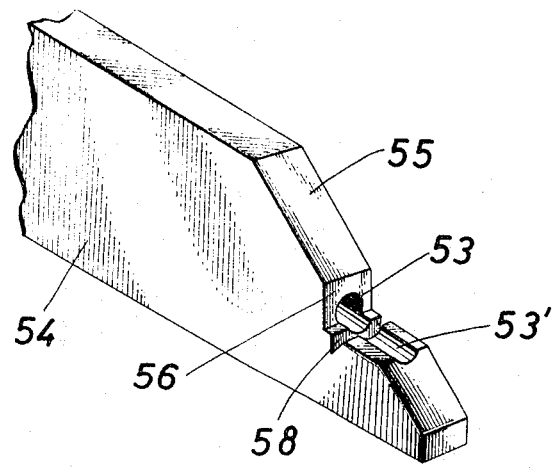
FIG. 6 is an enlarged perspective view of a part of the bit of another embodiment.

The preferable examples of the hollow bits 4 of the above-mentioned device are shown in FIGS. 5 and 6. The bit body 51 is provided with a rear connecting end 52 to be fixed to the suction pipe, and a solder suction hole 53 is provided through said bit body 51 and the connecting end 52. A flat portion 54 is formed in the front or free end portion of the bit body 51 and an inclined face 55 is formed at the top portion of said flat portion 54. The above-mentioned suction hole 53 is exposed at about the center of this inclined face 55. A right-angled notch 56 is formed in the middle of said inclined face 55, i.e. at the opening of said suction hole 53, where the degree of cutting of the notch 56 is such that some portion of the suction hole 53 is left on the face of the notch 56 to form a slight groove 53'. Notch 56 and groove 53' receive the molten solder. Connecting end 52 may be formed by inserting a proper tubular member into said bit body 51 and welding them together. The above-mentioned notch 56 can be provided with another groove 58 in the shape of "U" or "V" in its cross section and in the direction of the right angle to the suction hole 53. This groove 58 is used to settle the bit body 51 or to prevent it from trembling by engaging with a plate member or a contact during the melting operation, and at the same time, the groove 58 prevents the falling in drops of the molten solder.

Figure 7:
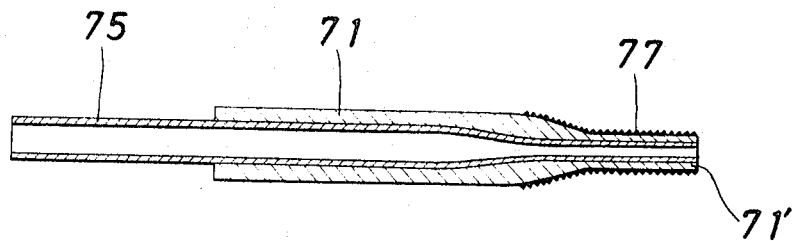
FIG. 7 is a sectional view of still other embodiment of the bit.
Figure 8:
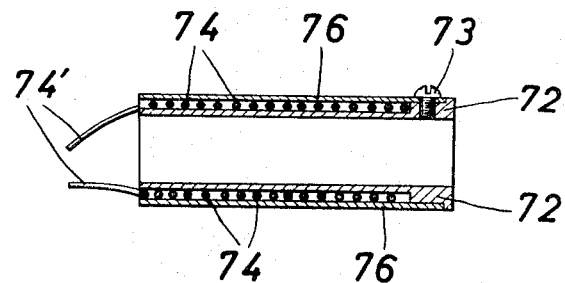
FIG. 8 is a sectional view of the heater to be attached to the bit as shown in said FIG. 7.
Figure 9:
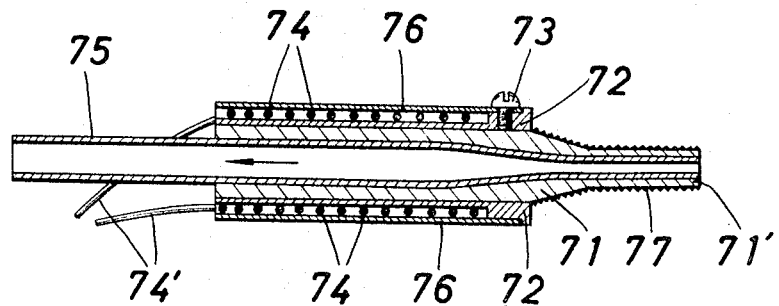
FIG. 9 is a sectional view of the combination of the bit in FIG. 7 and the heater in FIG. 8.

Further, in the example as shown in FIGS. 7 to 9, a suction pipe 75 made of an anticorrosive alloy, for example, stainless steel, is inserted into the hollow bit 71 made of copperchromium alloy, and the tip of said suction pipe 75 is extended to the top end 71' of the bit 71. One third of the length of said bit 71 in the top end portion is coated with an insulation 77 such as spraying of fused alumina or porcelain enamel.

FIG. 8 shows a heater to heat the hollow bit 71, in which a heating element 74 is provided around a heat receiving section 72 and both ends 74' of said heating element 74 are connected to the electric power source through a proper switch (not shown). The numeral 76 is a cover for the heating element 74 and the numeral 73 is a set screw for fixing the hollow bit 71.

In FIG. 9, the combination of the above-mentioned bit 71 and heater in cross section is shown. The bit 71 is inserted into the heater and is fixed by the set screw 73. This embodiment is characterized in that the bit body has anticorrosiveness and is applied with an insulation. Therefore the trouble such as a short-circuit is not caused.

Figure 10:
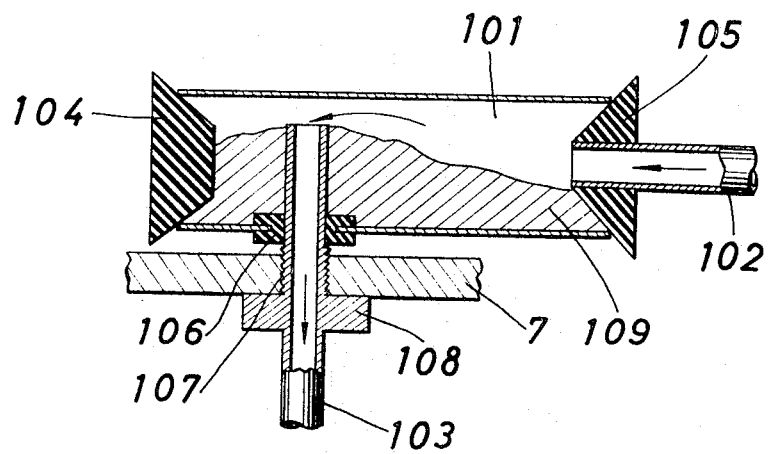
FIG. 10 is a vertical sectional view of the solder receiver which is used for the solder removing apparatus of the present invention.

The molten solder receiving device being used for the solder removing apparatus of the invention is shown in FIG. 10 and comprises a solder receptacle pipe 101, a suction pipe 102 and a take out pipe 103, in which one end of said receptacle pipe 101 is closed by a sealing member 104 made of heat resisting rubber, for example, silicone rubber and the other end of said pipe 101 is provided with said suction pipe 102 using the similar sealing member 105. The side portion of said receptacle pipe 101 is provided with said take out pipe 103 which is slidably attached by using another sealing member 106 made of heat resisting rubber. Said take out pipe 103 is formed with a threaded portion 107 and a knob 108, whereby the take out pipe 103 can be slid through said sealing member by the engagement between the threaded portion 107 and the wall of the support tube 7. The solder receiver is fitted into the supporting tube 7 of the solder removing apparatus, where the above-mentioned suction pipe 102 is communicated to the hollow bit through the heater section, and said take out pipe 103 is communicated to the vacuum device by way of the air stop valve. The the numeral 109 indicates the molten solder which is introduced by vacuum in the receptacle pipe 101.

The melt-suction type solder removing apparatus of the present invention is provided with the air stop valve and the vacuum charge tank in the hand grip of the apparatus, so that a stable solder removing operation can be carried out even in a place distant from the vacuum pump to improve the workability. The apparatus is provided with a heat insulating structure, so that the overheating of the hand grip can be prevented. Further, the suction regulating member is near the vacuum pump to keep the pressure in the vacuum charge tank at a certain value, whereby excess load to the vacuum pump can be prevented. In addition, the hand grip is provided with a regulating valve for the air flow so that the most appropriate vacuum level can be selected according to the operation to be carried out.

Further, with regard to the hollow bit having the flat top portion, it is provided with the inclined face and the notch at the center of the inclined face. Thus, the melting and suction of the solder can be carried out with ease and productivity is increased. The bit is coated with insulation material, not only so that the short circuit in the solder removing work to the complicated circuits or narrow terminals can be prevented but also so that the surface oxidation of the bit by heating can be prevented. Therefore the device can be used for a long term.

Still further, with regard to the solder receiving device as shown in FIG. 10, it is provided with the take out pipe in right angle to the suction pipe. Therefore the solder stopper is not necessary and the molten solder is received evenly. Accordingly, much solder is received in a predetermined space.

It should be emphasized, however, that the specific embodiments described and shown herein are intended as merely illustrative and in no way restrictive of the invention.

What is claimed is:

1. A solder removing apparatus, comprising:

a hollow bit with an inlet opening through which solder is drawn and an exit through which solder is adapted to exit into a hollow tube;

a hollow tube having an inlet connected with said bit exit, and an exit connected with a solder receiving chamber;

a heater surrounding said hollow tube; said heater comprising an enclosed hollow housing within which is positioned said hollow tube and a heater coil, said heater coil being positioned adjacent to said tube to heat it; said heater being connected to heat said bit through connection of said hollow tube with said bit;

a solder receiving chamber connected with said hollow tube exit; said solder receiving chamber having an air exit connected with an air passage;

a hand grip supporting said receiving chamber, said hollow tube and said bit; an air passage extending through said hand grip, which passage communicates at one end with said air exit of said receiving chamber thereby to create suction in that chamber and in said hollow tube and said bit;

a vacuum pump communicating with the other end of said air passage;

an air stop valve in said hand grip and located in said air passage for being operated to selectively open and close said air passage; a trigger external to said hand grip and connected to said valve for operating same for opening and closing said air passage;

a solder stopper being provided at said exit of said solder receiving chamber for blocking exit of solder into said air passage, and filter for blocking solder while permitting air to pass thereby is provided on said solder stopper;

said solder receiving chamber being a separate removable element provided within a hollow support tube and that said support tube is attached to said hand grip and is positioned between said heater and said hand grip, and said solder receiving chamber is made of glass.

2. A solder removing apparatus as claimed in claim 1, in which said solder receiving chamber support tube is rotatable and is provided with electro-conductive rings around its outer surface, a power supply connected with said rings to supply electric power thereto, said rings being electrically connected with said heater so that the electric power to said heater is supplied through said electro-conductive rings.

3. A solder removing apparatus as claimed in claim 4, further comprising a vacuum charge tank that fills a portion of said hand grip and is located between said valve and said vacuum pump and that communicates through said air passage with said receiving chamber; said vacuum pump communicating with said air passage by means of and through said vacuum charge tank.

4. A solder removing apparatus as claimed in claim 3, in which said air passage is communicated to said vacuum pump through a pipe having a joint therein, said joint being provided with a suction regulating member comprising a conduit communicating with the ambient atmosphere and a ball valve in said conduit support normally closed by a coil spring which allows said ball valve to open at a predetermined suction pressure in said air passage.

* * * * *